(Model.)

3 Sheets—Sheet 1.

T. H. COOK.
Stone Dressing Machine.

No. 237,961.   Patented Feb. 22, 1881.

Witnesses:
W. C. McArthur
Geo. R. Porter

Inventor:
Thomas H. Cook,
per. Chas. H. Fowler
Attorney.

(Model.)
3 Sheets—Sheet 2
T. H. COOK.
Stone Dressing Machine.
No. 237,961. Patented Feb. 22, 1881.
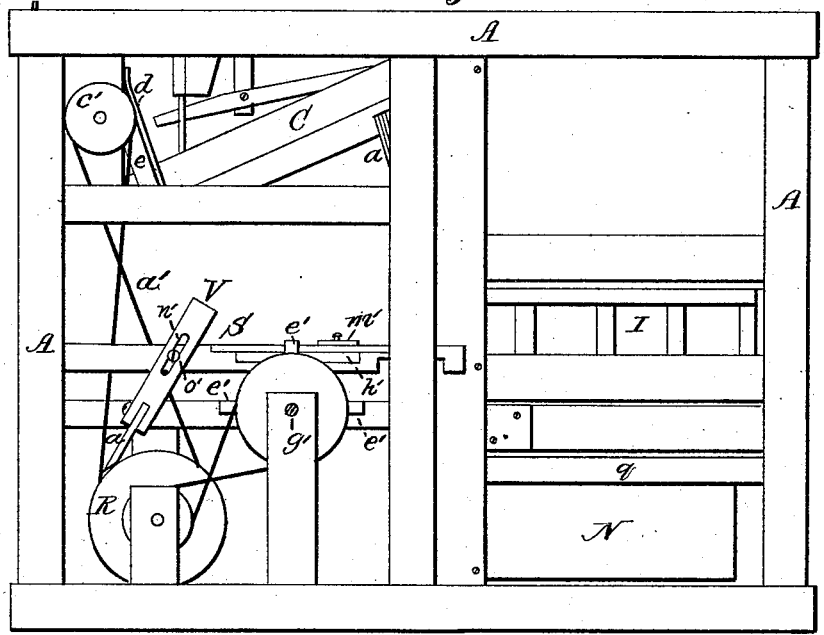
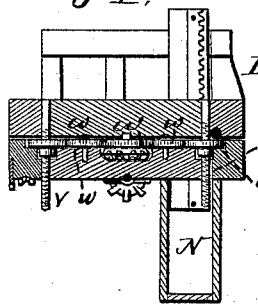
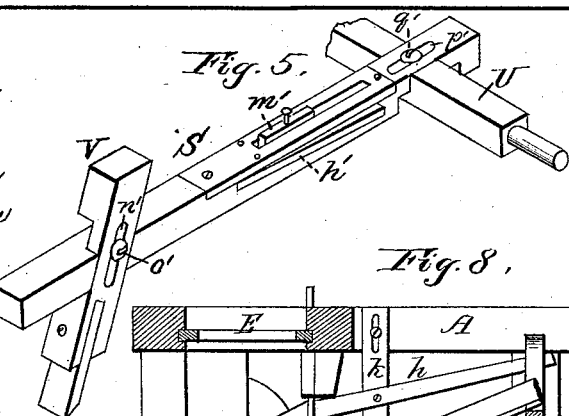
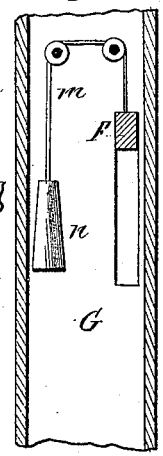
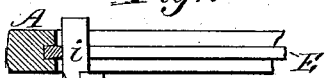
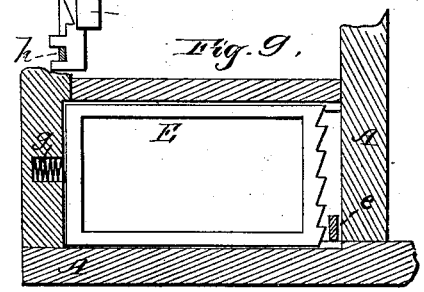
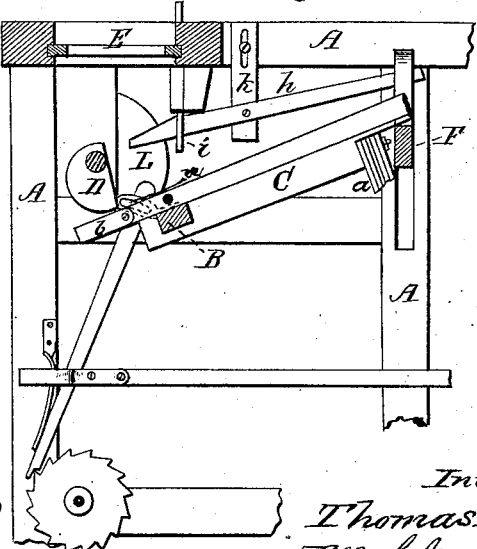
Witnesses:
Inventor
Thomas H. Cook,
per Chas. H. Fowler
Attorney.

(Model.)
T. H. COOK.
Stone Dressing Machine.
No. 237,961.  Patented Feb. 22, 1881.
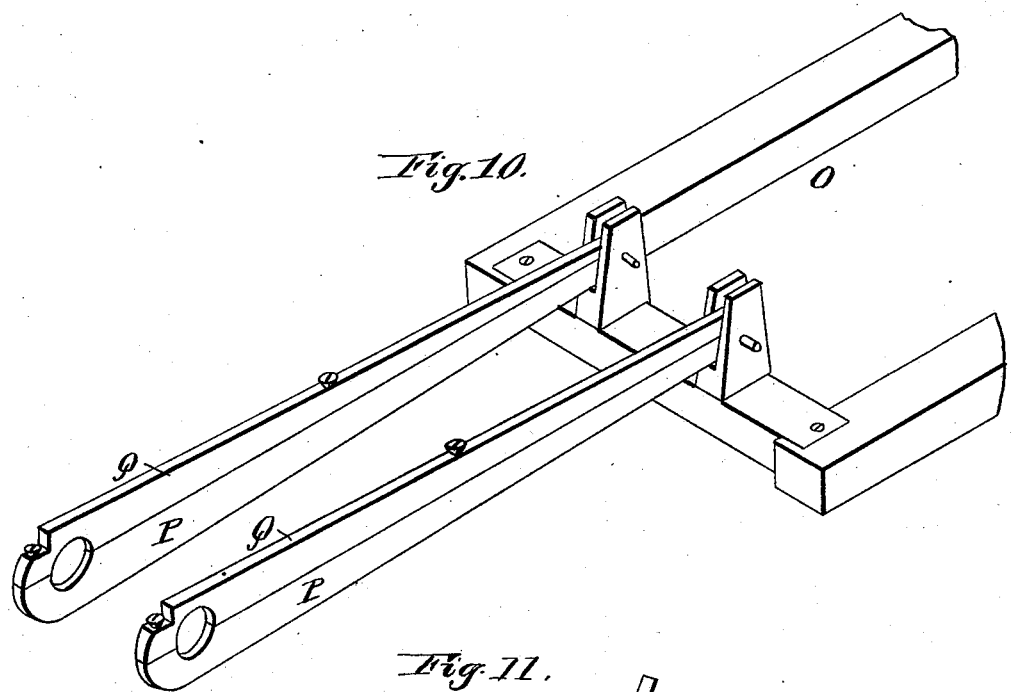
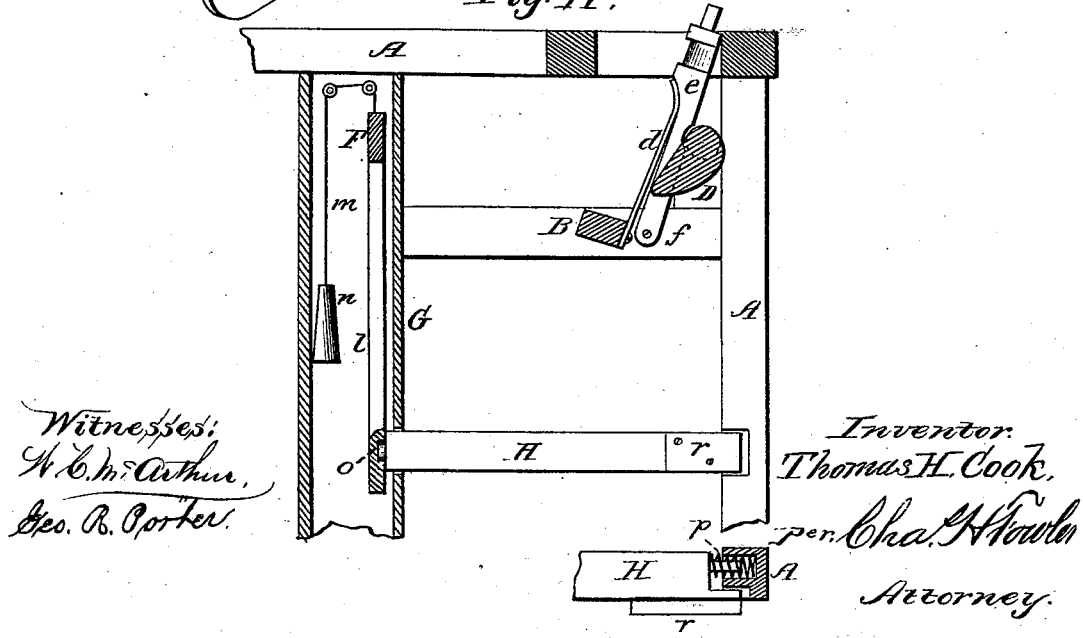
Witnesses:
W. C. McArthur
Geo. R. Porter
Inventor:
Thomas H. Cook.
per Chas. J. Fowler
Attorney.

UNITED STATES PATENT OFFICE.

THOMAS H. COOK, OF OWEGO, NEW YORK.

STONE-DRESSING MACHINE.

SPECIFICATION forming part of Letters Patent No. 237,961, dated February 22, 1881.

Application filed December 13, 1880. (Model.)

*To all whom it may concern:*

Be it known that I, THOMAS H. COOK, a citizen of the United States, residing at Owego, in the county of Tioga and State of New York, have invented certain new and useful Improvements in Stone-Dressing Machines; and I do hereby declare that the following is a full, clear, and exact description of the same, reference being had to the annexed drawings, making a part of this specification, and to the letters and figures of reference marked thereon.

Figure 1:
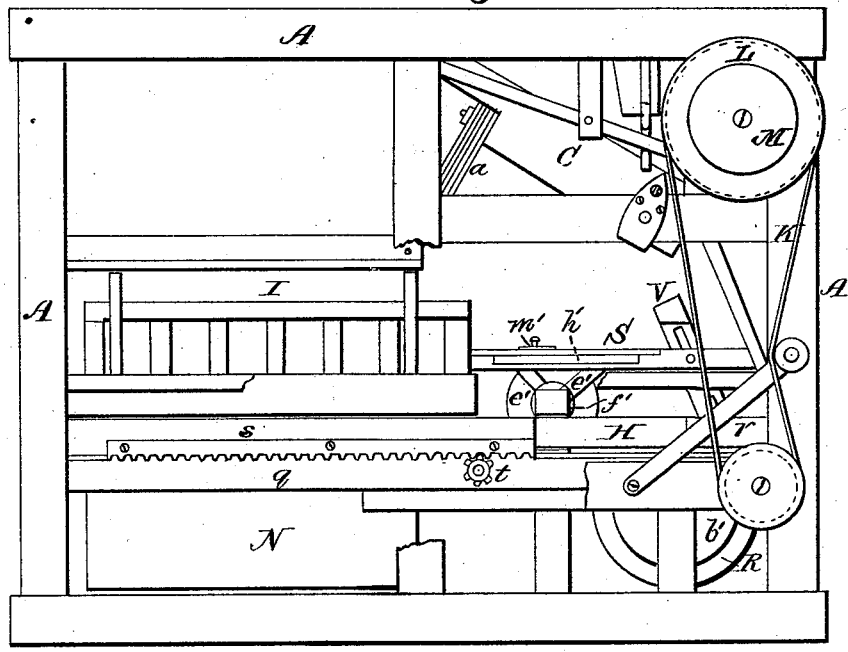
Figure 2:
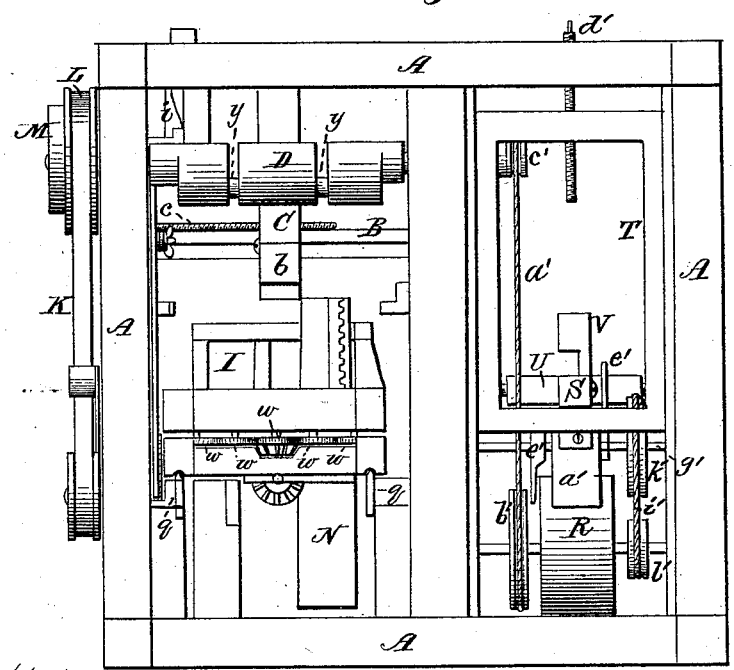

Figure 1 of the drawings represents a side elevation of my invention, with a portion of the frame-work broken away; Fig. 2, an end view of the same; Fig. 3, a side elevation, reverse of that shown in Fig. 1; Fig. 4, a detail view, partly in section, of the carriage and vertically-adjustable well; Fig. 5, a perspective view, in detail, of the adjustable head, tool-holder, and pivoted support, to which the head is connected; Fig. 6, a detail view, partly in section, of the hollow post, sliding cross-bar, cord, and weight; Fig. 7, a detail view of the slide for operating the rack. Fig. 8 is a detail side view of the inner portion of the frame-work, showing a portion of the operating mechanism; Fig. 9, a top-plan view of the rack with the frame-work in section; Fig. 10, a perspective view of the frame with pivoted levers, to which the stone to be polished is connected. Fig. 11 is a detail view of a portion of the operating mechanism.

The present invention has relation to certain new and useful improvements in machines for dressing stone, and to grind and sharpen the picks or knives used in the same; and it consists in the details of construction of the various parts of the machine, as fully shown in the drawings, and hereinafter described.

In the accompanying drawings, A represents the frame-work, to which the several parts of the machine are connected and supported. To this frame is journaled a horizontal shaft, B, to which is connected a trip-lever, C, having secured to its free end one or more knives, $a$. To the opposite end of the lever C is a jointed foot, $b$, against which is brought a cam-shaft, D, rotated by belt and pulleys, hereinafter described. This jointed foot $b$ is for the purpose of raising the stroke of the trip-lever C; or, in other words, regulating the extent of stroke, by either turning the foot down or up, as the case may be, said trip-lever being moved laterally along the shaft B, or from side to side by means of a screw-rod, $c$, provided upon its end with a suitable crank for turning it, the screw-rod passing through the side of the trip-lever near its end. To increase the power of the stroke there is a spring, $d$, secured to the end of the shaft B, the upper or free end of the spring resting against an upright lever, $e$, pivoted at its lower end to the side of the horizontal cross-piece $f$ of the frame-work A, so that when the lever is thrown forward more pressure is exerted upon the spring.

A rack, E, as illustrated in Fig. 9, slides horizontally in the upper portion of the frame A, the notches of said rack engaging with the lever $e$ by the pressure of a suitable spring, $g$, which forces the rack forward when released, as will be hereinafter more fully described.

Under the free end of the lever C is a cross-bar, F, upon which the lever rests and is stopped when not stopped by the knives coming in contact with the stone, said cross-bar moving or sliding vertically within the frame A by means which will be presently described.

To the end of the sliding bar F is engaged a lever, $h$, as shown in Fig. 8, the same being connected with a slide, $i$, and pivoted to a vertically-adjustable bracket, $k$, said slide having on one side an incline plane, by which means the rack E is drawn back when the bar F is thrown up. The lever $e$ can also be released from the rack E by drawing it back by hand, when required. Upon the opposite end of the cross-bar F is secured an upright, $l$, which is incased in a hollow post, G, and to which is attached a cord and weight, $m$ $n$, said cord passing over suitable pulleys, also incased with the cord and weight in the hollow post, by which the cross-beam F is raised. When the machine is put in operation this cross-bar F is shoved down and is held there by a pin, $o$, upon the end of a sliding beam, H, which engages with a notch in the side of the upright $l$, and held there by a spring, $p$, at the opposite end of the beam. As the carriage, which will be hereinafter described, is fed along and it reaches its extremity a stop or projecting portion thereof comes in contact with the shoulder r, upon the inner side of the sliding beam H, forcing the beam back and releasing or disengaging the pin o with the notch in the upright l, which is immediately thrown up by the weight n.

The carriage upon which the stone is placed is represented at I, and is fed forward by a rack, s, secured to the side thereof, which engages with a pinion, t, the latter being operated by a ratchet motion working from arm u on the shaft B, and the carriage is run back by throwing on the belt K from pulley L to pulley M, the cross-bar F being then shoved down, and the work is again proceeded with.

To dress various thicknesses of stone the carriage I is made to rise or lower by means of four screws, v, operated together by a series of cog-wheels, w, moved by a crank upon the end of a shaft. Various other means, however, may be employed for rendering the carriage vertically adjustable, as found desirable, as I do not desire to confine myself to the construction shown; neither do I to the means shown for feeding the carriage along and upon its track q, as it is evident that other means may be substituted without departing from the principle of my invention.

Upon the inner side of the carriage-bed may be arranged a loose plank to cover a well, which can be removed for the purpose of placing a stone up edgewise, the well N also being adapted to be raised or lowered by a rack and pinion or other suitable means adapted to the purpose.

When it is desired to polish the stone a holder for the same is provided, which consists of the frame O, for connecting thereto the stone. This frame has pivoted to it levers P, having detachable sections Q, by which the free ends of said levers are connected to eccentrics y upon the cam-shaft D, whereby a reciprocating motion is imparted to the frame.

Upon the opposite side of the frame-work A is an attachment for grinding the picks or knives used in dressing the stone.

The grindstone represented at R is driven by a belt, a', passing over the pulley b' on the shaft of the grindstone and up over a pulley, c', upon the end of the cam-shaft D. Over the grindstone R is a movable head, S, as illustrated more fully in Fig. 5, to which the picks or knives a are connected when required to be ground. One end of this head S rests upon a sliding frame, T, which can be raised or lowered by a screw-rod, d', while the opposite end of the head S is adjustably connected to a pivoted support, U, the latter having sufficient lateral play to allow the head to traverse from side to side and thereby keep the face of the grindstone true. This lateral motion is produced by the arms e' projecting radially from a drum, f', upon a shaft, g', said arms e' striking at their inner faces upon either side of the head S alternately, or rather against cheek-pieces h', connected to the sides of the head. The shaft g' is given the required rotary motion by a cord or belt, i', passing over a pulley, k', upon said shaft, and over a pulley, l', upon the shaft of the grindstone. Thus, by the employment of the cheek-pieces, together with the radial arms, a lateral reciprocating motion is imparted to the head which carries the pick or tool to be ground. The cheek-pieces h' are made adjustable by a sliding wedge, m', so as to produce more or less travel to the head S, and the tool-holder V is made to rise or lower by the elongated slot n' and set-screw o'. The head S is also adjustable in a direction to or from the pivoted support U by slot and set-screw p' q', the object being to adapt it to the stone as the latter wears away.

Having now fully described my invention, what I claim as new, and desire to secure by Letters Patent, is—

1. In a stone-dressing machine, the trip-lever C, carrying knives or picks a, and jointed foot b, in combination with the cam-shaft D, said lever being adjustably connected to the pivoted shaft B, substantially as and for the purpose set forth.

2. The rack E, spring g, lever e, and spring d, in combination with the pivoted shaft B, adjustable lever C, having jointed foot b, and the cam-shaft D, substantially as and for the purpose specified.

3. The combination, with the rack E, constructed to operate as described, of the sliding cross-bar F, lever h, and slide i, substantially as and for the purpose described.

4. The pivoted shaft B, carrying the trip-lever C, with knives or picks a, in combination with the sliding cross-bar F, upright l, and the sliding beam H, with pin o, and spring p, substantially as and for the purpose set forth.

5. The combination, with the carriage I, and means, substantially as described, for propelling it, of the cross-bar F, cord and weight m n, upright l, sliding beam H, with pin o, spring p, and shoulder r, substantially as and for the purpose specified.

6. In a stone-dressing machine, the carriage I, provided with screws v, and series of toothed wheels w, arranged to operate as described, in combination with the well N, connected to the carriage, and capable of vertical adjustment with relation thereto, substantially as and for the purpose set forth.

7. In a stone-dressing machine, the combination, with the shaft D, having eccentrics y, of the frame O, for holding the stone, said frame having pivoted to it levers P, with detachable sections Q, substantially as and for the purpose described.

8. In a stone-dressing machine, the combination, with the horizontally-adjustable head S, for holding the knife or pick to be ground, provided with adjustable cheek-pieces h', of the radial arms e', and the pivoted support U, the whole constructed to operate substantially as and for the purpose set forth.

9. The head S, adjustably secured to the pivoted support U, and carrying tool-holder V, adjustable thereon, and the adjustable cheek-pieces $h'$, in combination with the radial arms $e'$, and the vertically-adjustable frame T, upon which the free end of the head S rests, substantially as and for the purpose specified.

In testimony that I claim the above I have hereunto subscribed my name in the presence of two witnesses.

THOMAS H. COOK.

Witnesses:
T. B. ARMSTRONG,
B. C. SPRINGSTUN.